(No Model.)   2 Sheets—Sheet 1.
E. THOMSON.
APPARATUS FOR ELECTRIC WELDING.
No. 385,022.   Patented June 26, 1888.
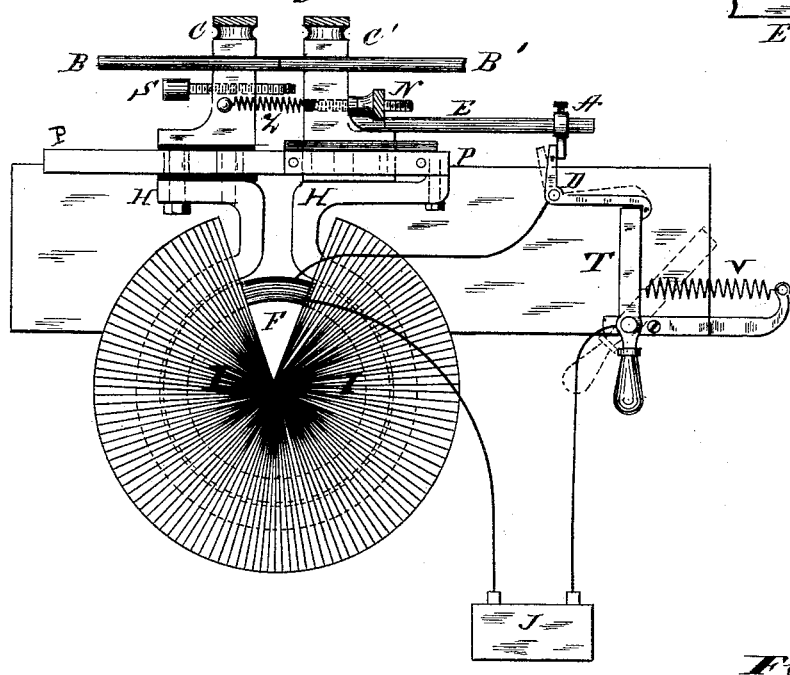
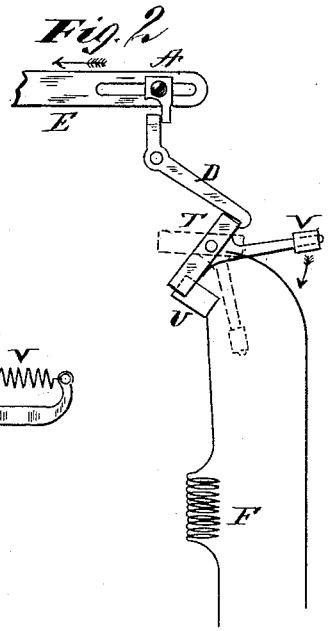
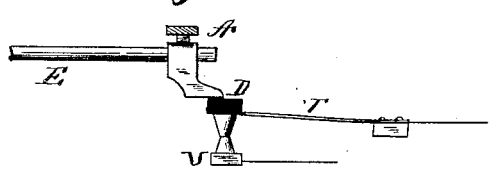
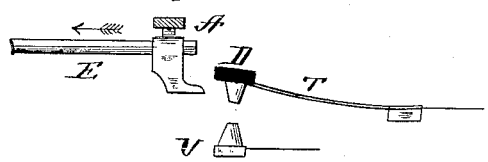
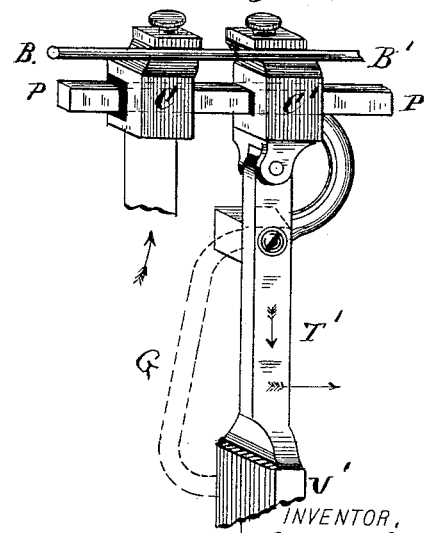
WITNESSES:
Gabriel J. W. Galster
Wm H. Cake
INVENTOR,
Elihu Thomson.
BY
Townsend MacArthur
ATTORNEYS.

(No Model.) 2 Sheets—Sheet 2.
E. THOMSON.
APPARATUS FOR ELECTRIC WELDING.
No. 385,022. Patented June 26, 1888.
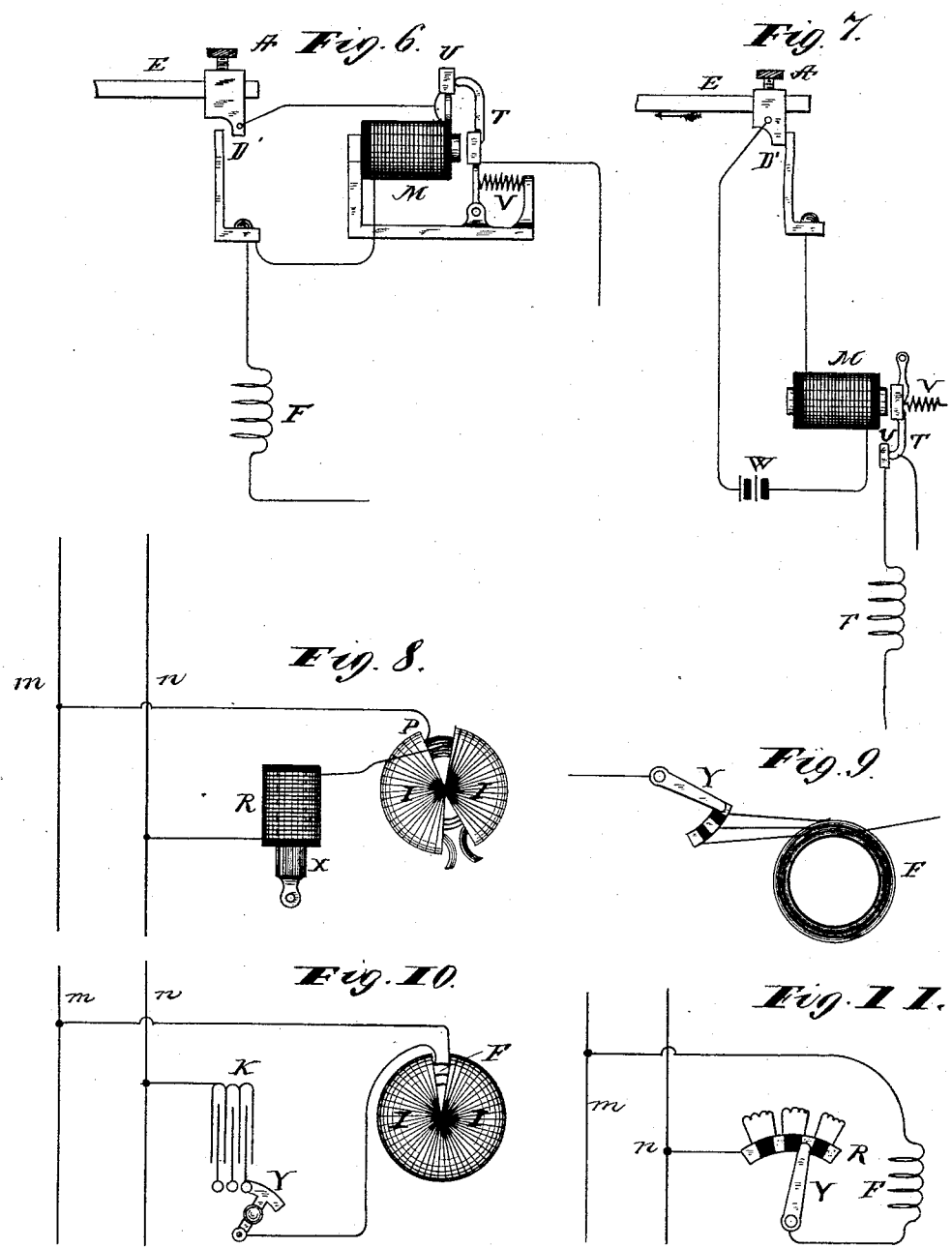

UNITED STATES PATENT OFFICE.

ELIHU THOMSON, OF LYNN, ASSIGNOR TO THE THOMSON ELECTRIC WELDING COMPANY, OF BOSTON, MASSACHUSETTS.

APPARATUS FOR ELECTRIC WELDING.

SPECIFICATION forming part of Letters Patent No. 385,022, dated June 26, 1888.

Application filed July 25, 1887. Serial No. 245,186. (No model.)

*To all whom it may concern:*

Be it known that I, ELIHU THOMSON, a citizen of the United States, and a resident of Lynn, in the county of Essex and State of Massachusetts, have invented certain new and useful Apparatus for Electric Welding, of which the following is a specification.

My present invention relates to an improvement in electric welding apparatus whereby the welding-current may be automatically cut off from the machine upon the completion of the welding process or the carrying of the welding to a predetermined point. By this improvement the machine becomes practically automatic in its operation, requires little or no attention except to place the pieces in the clamps and switching on the current, and the process may be rapidly and indefinitely repeated without the readjustment of the machine.

To this end my invention consists, particularly, in the organization of the clamps for holding the pieces to be welded. One of the clamps is made movable and serves, in conjunction with other devices controlled thereby, to cut off the welding-current when the movable clamp has reached a certain point due to the welding of the pieces. The movable clamp is provided with an attachment for operating a detent or directly opening an electric switch which cuts off the current which furnishes the energy for the electric welding. I may in the use of induction-coils interrupt either the primary or secondary circuit. In the case of other currents being employed I may either partially interrupt or cut off the welding-current directly.

My invention further consists in certain details of construction, which will be more particularly described hereinafter, and pointed out in the claims.

In the accompanying drawings, forming a part of this specification, Figure 1 is a side elevation of a welding apparatus provided with my present invention. Figs. 2, 3, 4, 5, 6, and 7 illustrate modifications of the cut-off mechanism. Fig. 8 shows a device for controlling the volume of the welding-current. Figs. 9, 10, and 11 show modified forms of the apparatus shown in Fig. 8.

In Fig. 1, I I is an iron wire sheathing surrounding two electric conductors forming an induction-coil. The inner of these conductors, F, is a coil of a number of turns of insulated wire. The outer conductor, whose terminals are shown at H H, is a single heavy strand or band of copper parallel to the coil F through most of its length. The two conductors are sheathed in iron wire, I I, over the outside and through the center. The terminals of the secondary conductor H H are carried to and attached, respectively, by screw and sliding joints to the clamps C and C'. The clamp C is, however, insulated from the base-plate or guiding-plate P P by interposed insulation, but is firmly bound down thereto by bolts and thoroughly connected by an electric conductor to H. The bolts themselves may be made of heavy copper bars passing through the plate P P and not touching the same. The clamp C is any ordinary arrangement for clamping in position a bar, plate, or wire of metal, B, of any regular or irregular form. The clamp C' is a counterpart of the clamp C, except that it slides upon a base-plate, P P, in suitable guides, and is impelled toward C by the spring Z, adjustable by a nut and screw at N. The spring Z is insulated, so that it does not make connection between the clamps. The clamp C is, however, in solid and secure metallic connection with the bar H, or rather with that end of it not connected to the clamp C'. The screw S, through the clamp body C, is used to hold apart the clamps at any given distance during the insertion of the pieces B B' and abutment thereof between the clamps, in accordance with my prior inventions on electric welding. The screw S is of course relieved or turned back when the welding is ready to be done.

An attachment or rod, E, extending from the movable clamp C', carries on it an adjustable piece, A, which may be set along the bar in any desired position. This adjustable piece A, on the movement of the clamp-spring Z, acts to trip a detent-lever, D, which, when in the position shown in full lines in Fig. 1, holds the switch-arm T in the position shown in the figure, but which on the movement of the clamp C' toward C, due to the union or welding of the bars B B' at their abutted ends, strikes the short arm of the detent-lever D, trips it from contact with the switch-lever T, which lever, impelled by the spring V, passes over into the inclined position shown by the dotted lines in Fig. 1. The result of this movement is to rupture or open the circuit of the alternating current fed to the primary coil F from any suitable generator, as J, and thereby to cause the generation of the secondary currents which effect the welding of the bars B B' to cease.

Other bars may be set in place and the operation rapidly repeated. The adjustment of the piece A is such that a certain yielding shall take place before the current is switched off, as described.

Instead of breaking the circuit of the primary-current coil at the place of contact of the detent-lever D and the switch-lever T, the bar E and adjustable piece A may be arranged to act as in Fig. 2. Here the detent-lever simply permits the switch-lever T to be thrown around under the action of a weight or spring, V, so that the switch-lever will break contact with another contact-surface, U, independent of the detent-lever D. The movement, then, of the piece A to the left trips that end of the detent-lever D which is in engagement with the switch-lever T, which switch-lever is then free to move and open contact by swinging on its center away from the plate U, F being, as before, the primary coil.

It is not necessary that the rupture of the circuit be made by the tripping of the detent-lever simply. The modifications in Figs. 3 and 4 show how it may be accomplished in other ways. The bar E carries the adjustable piece A, as before, which, in the position shown in Fig. 3, or before the yielding of the pieces that are welding, holds down the switch-lever T by pressing on its insulated head D, thus keeping it in contact with the other fixed surface, U. The switch-lever T is a flat spring tending to bend upward. This it does when by the movement to the left of the pieces E and A the surface D escapes the holding-down action of the piece A. The spring action of the spring-lever T then raises it out of contact with the part U, thus rupturing the circuit of the primary coil.

In Fig. 5 I have shown how the rupturing action may be accomplished by the movement of a clamp connected directly on the circuit of the secondary bar. Here the clamp C is fixed and the clamp C' is movable, as before, toward the clamp C. On the welding of the ends of the bars B B' where abutted, the clamp C', sliding along the guiding-bar P, moves the short arm of the lever T', the other end or arm of which at its extremity bears on a large and extended contact-surface, U', which is attached to the source of the welding-current, such as a bar, H H, Fig. 1, the circuit being completed from the source of welding-current to the clamp C, then through the bars B B' where abutted down through the lever T' and the contact-surface U'; but as this would be attended generally by a vigorous and destructive spark of rupture, especially when the current is of large volume, such as is used when dealing with good-sized pieces, it is preferable to provide a resisting shunt, G, (shown in dotted lines,) around the contact between T' and U', the resistance of the shunt G being made such that when it comes into action as the sole means of conduction between the surface U' and the clamp C' it will not convey sufficient current to continue the softening or welding of bars B B'.

In Fig. 6 I have shown how an electro magnet may be employed to effect the opening of the primary circuit of F, instead of a detent-lever. The magnet M is put into circuit with F and holds, when such circuit is provided with current, its armature attracted against the retractile force of a spring, V, so that the contact-lever T bears upon the fixed surface U, thereby effecting a circuit through F M U T and around to the source of current.

The adjustable piece A on the bar E, instead of tripping a lever, as in former figures, is attached to one end of the wire of the magnet M, while a fixed piece, D', is attached to that part of the circuit leading to the other end of the wire of the magnet M. When the clamp which carries the piece A moves so as to cause it to fall into contact with the piece D', it shunts the magnet M, which thereupon releases its armature and allows the contact at T U to be opened by the retractile force of the spring V. It is not necessary to state that the piece D' or contact-surface upon which the piece A acts may itself be made adjustable, instead of effecting the adjustments by means of the piece A, which is, as in former figures, a detent-lever switch appliance made to be adjustable in position. Indeed, no adjustment of these parts is necessary if the parts are originally constructed to bear such a relation to each other and to the work to be accomplished that the set of the pieces in the clamps will cause the proper relations to exist between the tripping-piece A, the switch-actuating piece, and the detent or switching device.

In Fig. 7 I have shown the reversion of function of the pieces A and D', in which the magnet M is made to lose its power upon the opening of the circuit consequent upon the opening of the contact between D' and A. In this case it is desirable to have one or the other of the pieces D' and A made springy, so that the contact-surface shall be held closed until a predetermined movement shall have been given to the piece carried thereby.

A battery or source of current, W, is in circuit with the magnet M and the contact between A and D', while the primary coil of the welding arrangement is kept closed or kept connected with its source of current only when the contact between T and U exists, as when the magnet M is energized. The spring V serves, as before, to open the contact at U when said magnet is not energized. It will readily be seen that the circuit of the battery and magnet M will be ruptured by the movement to the left of the piece A, carried by the bar E, responding to the movement of the holding-clamps.

My invention is not limited to the devices just described for cutting off the energizing-current, as there are numberless other modes of utilizing electro-magnets, a magnet-detent, and tripping devices which will give similar results to those which I have described.

It is often desirable where the work is varied and where the potential of the source of the current utilized needs to be controlled (as when the apparatus of Fig. 1 is used in a branch from a constant potential alternating-current main) that some means should exist for controlling the volume of flow of such current through the primary coil F. This is especially the case where different sizes of work and work of different characters are to be operated upon by the same apparatus, for the electric energy which would be sufficient to effectually weld small pieces might be insufficient for large pieces, and the energy which would weld large pieces might volatilize or destroy smaller pieces. To control the amount of current which is received by the coil F, several devices may be employed, one of the best of which I have shown in Fig. 8. It is a coil of wire provided with an iron core, the position of which or the power of which to close the magnetic circuit through the axis of the core is varied. It acts by its tendency to set up a lag or shift in the currents received by the primary coil, or, in other words, it acts by the counter electro-motive force tendency. A similar result can be accomplished by winding the coil F in layers, so that by a switch-arm, Y, Fig. 9, one or more of the layers may be cut out, or several separate coils may be used and one or more of the coils be coupled into action by a suitable switching device.

Another arrangement is shown in Fig. 10. It consists of an adjustable condenser in the circuit from the mains $m$ $n$ to the primary coil of the induction coil F. By adjusting the amount of surface exposed by the condenser to the alternating currents received from the mains $m$ $n$, an exact measure of the flow of current through the primary coil F may be had and any amount be permitted to pass through F that may be needed for the purpose, provided the condenser be sufficiently large to admit it. The condenser-regulator is more applicable to very small currents needed in the primary, as for large work requiring heavy currents the surface needed will be too large.

Another method of adjustment, and the one least economical of power, is that shown in Fig. 11, which is nothing more than the introduction of a variable resistance, R, with a switch for controlling the same, Y, introduced in the circuit between $m$ and $n$ through the primary-coil F.

What I claim as my invention is—

1. In an electric welding apparatus, the combination, with a movable clamp, of mechanism controlled thereby to cut off the welding-current at a predetermined point, as and for the purpose described.

2. In an electric welding apparatus, the combination of clamps for holding the pieces to be welded, and mechanism controlled by the movement of one or both of the clamps to cut off the welding-current at a predetermined point, substantially as specified.

3. In an electric welding apparatus, the combination of clamps for holding the pieces to be welded and adjustable cut-off mechanism controlled thereby to cut off the welding-current at a predetermined point, substantially as specified.

4. In an electric welding apparatus, the combination of clamps for holding the pieces to be welded and conveying the current therethrough and an adjustable cut-off mechanism actuated thereby for cutting off the welding-current from said clamps at a predetermined point, substantially as specified.

5. In an electric welding apparatus, the combination of a movable slide, a clamp mounted thereon, an adjustable stop or equivalent device mounted on said slide, and circuit-controlling devices actuated by said adjustable stop to cut off the welding-current at a predetermined point, substantially as specified.

6. In an electric welding apparatus, the combination of a movable slide, a clamp mounted thereon, an adjustable stop mounted on said slide, a detent actuated by said stop to open a switch to cut off the welding-current at a predetermined point, substantially as specified.

7. In an electric welding apparatus, the combination, with a movable clamp or clamps, of a switch-actuating device controlled thereby for cutting off the welding-current at a predetermined point.

8. In an electric welding apparatus, the combination of a movable clamp or clamps, switching mechanism for cutting off the welding-current, and switch-actuating mechanism controlled by said movable clamp to actuate the switch at a predetermined point.

9. In an electric welding apparatus, the combination of a fixed clamp, a sliding piece moving toward and away from said clamp, a clamp mounted on said slide, and a spring or equivalent device tending to force said clamps together, substantially as specified.

10. In an electric welding apparatus, the combination of a fixed clamp, a sliding piece, a clamp located thereon, a spring tending to force said clamps together, and means for adjusting the tension of said spring, substantially as described.

11. In an electric welding apparatus, the combination of a movable clamp, mechanism controlled thereby for cutting off the welding-current at a predetermined point, and means for varying the amount of current fed to the apparatus, substantially as described.

Signed at Lynn, in the county of Essex and State of Massachusetts, this 20th day of July, A. D. 1887.

ELIHU THOMSON.

Witnesses:
OTIS K. STUART,
J. W. GIBBONEY.